United States Patent Office 3,477,945
Patented Nov. 11, 1969

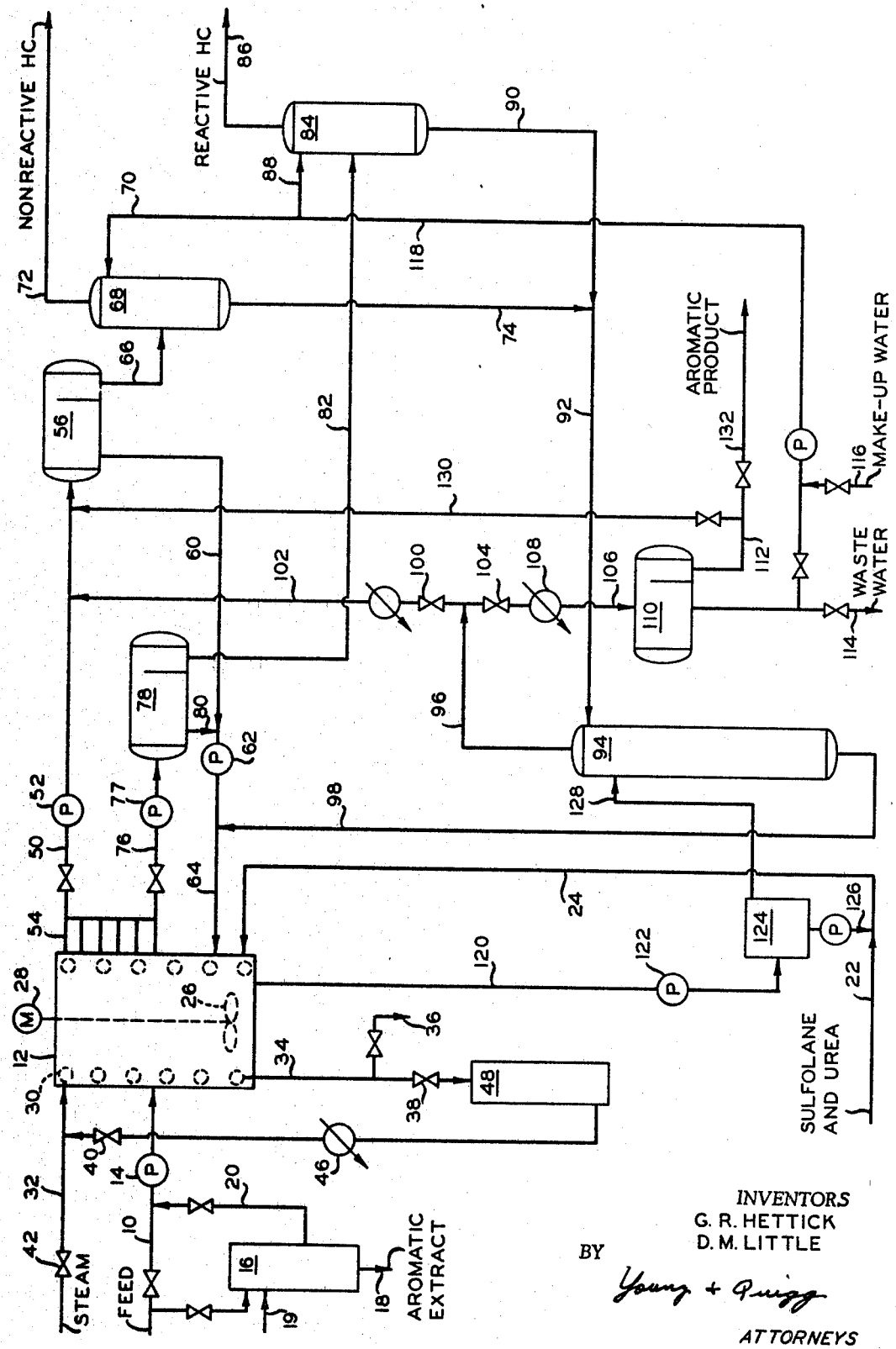

3,477,945
ADDUCT TYPE HYDROCARBON SEPARATION USING COMBINATION REACTOR AND DECOMPOSITION ZONE
Donald M. Little and George R. Hettick, Bartlesville, Okla., assignors to Phillips Petroleum Company, a corporation of Delaware
Filed Dec. 18, 1967, Ser. No. 691,608
Int. Cl. C10g 21/06
U.S. Cl. 208—308         11 Claims

ABSTRACT OF THE DISCLOSURE

An amide capable of selectively forming a crystalline hydrocarbon adduct, a sulfolane compound, and a mixed hydrocarbon feed are added to a reaction vessel and mixed to form the adduct. After mixing, these reactants stratify into an upper unreacted hydrocarbon phase and a lower sulfolane phase containing the adduct crystals. The unreacted hydrocarbon phase is withdrawn as a product. The remaining sulfolane phase containing adduct crystals is then heated while still within the reaction vessel so as to decompose the adduct, the reactive hydrocarbon thus released forming a separate phase from the sulfolane. This reactive hydrocarbon phase is then withdrawn as a second product of the process.

Background of the invention

This invention relates to a method of, and apparatus for, the separation of hydrocarbons by the formation and subsequent decomposition of amide-hydrocarbon adducts in the presence of a sulfolane compound, all within a single reaction vessel, and without the use of a filtering or centrifuge step to separate the adduct crystals.

It has long been known to the prior art that urea or thiourea will react with certain adduct forming compounds to form adducts. Thus, for example, it is known that aurea will selectively react with straight chain hydrocarbon compounds having at least six carbon atoms per molecule to form a crystalline adduct, but will not react with branched chain hydrocarbon compounds. Further it is known that thiourea will selectively react with branched chain hydrocarbon compounds to form a crystalline adduct but will not react with straight chain hydrocarbon compounds.

According to the prior art, the adduct crystals are physically separated from the reaction mixture, for instance by filtration or centrifuging. These physically separated crystals are then heated to decompose the adduct and release the hydrocarbon. French Patent 969,979, for instance, discloses forming such complexes which are separated from the liquid materials by filtering and U.S. 2,911,350, Nov. 3, 1959, discloses either filtering or centrifuging to separate the adduct crystals from the nonreactive components and any diluent which may be present.

While this hydrocarbon adduct process for the separation of hydrocarbons has been known for many years, it has never achieved commercial success, at least partly because of the complexity of separating the adduct from the reaction mixture by either filtration or centrifuging.

Summary of the invention

It is an object of this invention to provide for the separation of a hydrocarbon-amide adduct from a reaction mixture without the use of a filtration or centrifuging step. A further object of this invention is to provide for a sulfolane compound phase in the reaction vessel into which hydrocarbon-amide adducts separate. A further object of this invention is to decompose the hydrocarbon-amide adduct in the presence of a sulfolane compound whereby the amide dissolves in the sulfolane compound as it is released thus eliminating the need for a filtration or centrifuging step. Yet a further object of this invention is to achieve an ultra pure product by means of adduct-type hydrocarbon separation. A still further object of this invention is to separate straight chain, branched chain, and aromatic hydrocarbons to yield products of high purity.

In accordance with this invention a mixture of hydrocarbons is separated by forming an adduct of the reactive hydrocarbon in the reaction vessel, recovering the unreacted hydrocarbon by phase separation, decomposing the remaining adduct while still in said reaction vessel, and thereafter recovering the released reactive hydrocarbon by second phase separation.

Brief description of the drawing

In the drawing, forming a part hereof, the figure is a schematic representation of one embodiment of the invention.

Description of the preferred embodiments

The term "sulfolane compound" refers to a compound of the following structural formula:

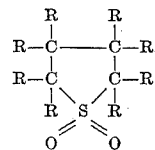

Each R can represent either a hydrogen atom or a hydrocarbon radical having from 1 to 6 carbon atoms per molecule. The preferred material is sulfolane, i.e., a sulfolane compound where each R in the above formula represents a hydrogen atom. Examples of substituted sulfolanes include 2-methyl sulfolane, 3-methyl sulfolane, 3-ethyl sulfolane, 2,4-dimethyl sulfolane, 2-butyl sulfolane, 2 - isobutyl sulfolane, 2-butenyl sulfolane, 2-cyclopentyl sulfolane, and the like.

The hydrocarbon feed can contain normal and branched chain paraffins, normal and branched chain olefins, naphthenics (cycloparaffins), such as cyclohexane, and aromatics. These hydrocarbons can have from 6 to 50 carbon atoms per molecule, preferably from 7 to 24.

The reactor temperature and pressure can vary widely depending on the type of hydrocarbon being separated. Generally a temperature of 90–135° F. and a pressure of 5–100 p.s.i.g. is used during the formation of the adduct. During the formation of the adduct the reaction mixture is agitated in order to provide production of preferred small crystals of adduct and also to provide intimate contact of the various reactants. After formation of the adduct the agitation will cease in order to allow the reactants to stratify into an upper unreactive hydrocarbon phase and a lower phase of sulfolane containing adduct crystals. After the unreactive hydrocarbon phase is removed the temperature of the reactor is raised to a level sufficient to break the adduct. Generally a temperature of 160 to 240° F. will be used, the adduct normally breaking at around 160° F. The pressure will generally be between 5 and 20 p.s.i.g. during the decomposition operation.

Referring now to the drawings, feed containing normal and branched chain paraffins from line 10 is metered into reaction vessel or zone 12 by pump 14. This feed can contain in addition to normal and branched chain paraffins normal and branched chain olefins, naphthenics (cycloparaffins) such as cyclohexane, and aromatics. In an alternate embodiment of this invention the feed from line 10 can be fed to aromatic removal column 16 wherein aromatic extract is removed and recovered via line 18 and substantially aromatic free feed is returned to line 10 via line 20. The solvent for aromatics is added to column 16 via line 19. Sulfolane plus urea is initially added to the reaction vessel via line 22 which connects with line 24. The sulfolane and urea can also be added via separate conduits. Since this is a batch operation, once the reactor is initially charged with sulfolane plus urea no additional sulfolane plus urea will be added to the system except that necessary to make up lost reactants. However, sulfolane and urea recovered during the various purification steps will be returned to the reaction vessel, for instance via line 24.

Agitation means such as stirrer 26 powered by motor 28 is provided to insure intimate mixing of the various reactants.

Low pressure steam is introduced into heat exchange coils 30 via line 32 and condensate is removed via line 34 which connects with line 36. During this portion of the cycle, valves 38 and 40 are closed. During the cooling portion of the cycle, valve 42 is closed, valves 38 and 40 are opened, and water circulated through heat exchange coils 30 by means of a water pump (not shown) which pumps water through cooler 46 and thence through coils 30 and back to water drum 48. In operation, the heat exchange coils 30 are on a cooling cycle during the charging of the reactants and during the reaction wherein the adduct is formed so as to cool the mixture to a temperature at which the adduct can form. During the time the phase separation between the nonreactive hydrocarbon and the sulfolane is taking place and during the time the unreactive hydrocarbon is being withdrawn neither steam nor cold water is circulated through these coils. Steam is then circulated through the coils during the part of the cycle where the reactants are heated to the point of breaking the adduct. During the time the resulting reactive hydrocarbon, which forms a separate phase from the sulfolane, is being pumped off neither cooling nor heating medium is circulated through the cooling coils. Any conventional heating and cooling means can be applied, for instance electrical resistance heaters can be used, although the use of a single set of cooling coils as illustrated is highly preferred since it simplifies the construction. This simplified construction is made possible by the fact that a single vessel is used on both the formation and decomposition of the adduct. Also depending on the lag between the time the heating or cooling medium is circulated and the time the reactants respond to this heating or cooling, slightly different heating and cooling cycles can be utilized.

After the reaction is complete, the agitation ceased, and the reactants have stratified into an unreactive upper layer and a lower layer of sulfolane containing adduct crystals in slurry, the nonreactive raffinate is withdrawn via line 50 by the action of pump 52. A plurality of withdrawal ports 54 are provided so as to make possible withdrawing substantially all of the nonreactive phase; each of these ports has a valve means (not shown) to allow the selective use of the port at the proper level. In place of this plurality of withdrawal ports it is apparent that a floating withdrawal tube or other suitable means could be utilized within the reactor.

This nonreactive hydrocarbon phase carried by line 50 is introduced into raffinate settler 56. Any entrained water and/or sulfolane settles out, is removed via line 60, and returned to the reaction vessel via line 64 through the action of pump 62. The separated hydrocarbon raffinate from settler 56 is introduced via line 66 to raffinate water wash column 68. Water is introduced into raffinate water wash column 68 via line 70. The washed nonreactive hydrocarbon is recovered from raffinate water wash column 68 via line 72. It is apparent that this water wash column is not essential to the operation of the invention and also that the raffinate settler could be replaced by other stripping means. Sulfolane rich water from the raffinate water wash is removed via line 74.

After the nonreactive hydrocarbon has been removed from reaction vessel 12 and the remaining reactants are heated to a temperature to break the adduct, a second phase separation occurs with the released (reactive) hydrocarbon from the adduct forming an upper phase and the sulfolane phase containing, in solution, the amide also released by the decomposition of the adduct, forming a lower phase. This upper phase of released reactive hydrocarbon is withdrawn via line 76 which connects with withdrawal ports 54. Again it is apparent that instead of utilizing withdrawal ports 54 the upper phase could be siphoned off by means of a floating withdrawal tube or other similar means.

This reactive hydrocarbon carried by line 76 is introduced through the action of pump 77 into reactive hydrocarbon settler 78. Reactive hydrocarbon settler 78 is similar to raffinate settler 56 in that it allows for the settling out of entrained water and/or sulfolane from the hydrocarbon. The water and/or sulfolane settling out in settler 78 is withdrawn via line 80 and introduced into line 60, through which it flows back to the reactor along with the water and/or sulfolane from raffinate settler 56. The separated reactive hydrocarbon is withdrawn from reactive hydrocarbon settler 78 via line 82 and introduced into reactive hydrocarbon wash column 84. Reactive hydrocarbon product is recovered from column 84 via line 86. Wash water is introduced into column 84 via line 88, and the sulfolane rich wash water removed from column 84 via line 90. The sulfolane rich wash water from column 84 is combined with the sulfolane rich wash water from column 68 carried by line 74. These combined lines form line 92 which introduces this sulfolane rich water into sulfolane rerun column 94.

Sulfolane rerun column 94 serves a dual function. First, rerun column 94 can be operated at a temperature within the range of about 210 to 250° F. in which case the water will be taken off the top via conduit 96 and the sulfolane recovered as bottoms product via line 98. The sulfolane from sulfolane rerun column 94 carried by line 98 is returned to the reactor via line 64. When operating in this manner valve 100 in line 102 is closed and valve 104 in line 106 is open. Water carried by line 96 flows through line 106 and condenser 108 to settler 110. Any hydrocarbon carried over with this water is recovered via line 112. Waste water is eliminated from the system via line 114. Make-up water is added to the system via line 116, if needed. The water from line 116 or from settler 110 is introduced via line 118 into lines 88 and 70.

Alternatively sulfolane rerun column is operated at a temperature in the range of 175 to 525° F. This alternative arrangement is designed for use when it is desired to separate aromatics from the sulfolane in the reactor. Sulfolane is withdrawn from the reactor, preferably during or after the heating cycle when the urea is in solution and no adduct crystals are present, through action of pump 122. This sulfolane is introduced into urea separator 124. The sulfolane plus urea is cooled prior to introduction into the urea separator 124 so as to precipitate the urea. The precipitated urea is then separated and then returned to the reactor via line 126. (Note this physical separation is of urea crystals. Under no circumstances is any filtering, centrifuging or other physical separation of adduct crystals utilized.) Sulfolane is decanted from the top of tank 124 and introduced into sulfolane rerun column 94 via line 128. The aromatics dissolved in the sulfolane are recovered from rerun column 94 via line 96. At this point valve 104 can be closed, valve 100 open, and the aromatics carried via line 102 to line 50 and thence to raffinate (now aromatics) settler 56. In such case the water will be removed via line 60 and the aromatics will be recovered via nonreactive product line 72. In this embodiment the aromatics have not necessarily been separated from the nonreactive material; however, they have been separated from the reactive hydrocarbon product. If no effort is made to remove aromatics from the system, the sulfolane will become saturated with the aromatics and the aromatics will still be recovered with the nonreactive material. (Thus line 120, column 94 and associated equipment can be dispensed with.) Alternatively, however, valve 100 can be closed and valve 104 opened in which case the aromatics are carried via line 106 to settler 110 where they are separated from the water and delivered via line 112 either to line 130, which conveys them to line 50 and thence to recovery as a part of the nonreactive product just as when valve 104 was closed and valve 100 was opened except that the water has been removed, or to line 132 where the aromatics are recovered as a product. The aromatics can be separately recovered via line 72 in the absence of raffinate or nonreactive product in this cyclic process. That is, aromatics can be introduced into settler 56 via line 130 during that part of the cycle where said settler has been emptied of nonreactive hydrocarbon.

In the case of extremely high boiling hydrocarbon materials the sulfolane can be taken off the top of column 94 and the hydrocarbon taken off the bottom.

In order to achieve higher purity, two of said reaction zones can be connected in series, one of the products of the first serving as the feed of the second. That is, reactive product from line 86 can be used as feed to an identical adduct type hydrocarbon separation system either where the identical amide is used in which case any nonreactive material carried over in the reactive stream of the first system will be separated out into the nonreactive stream of the second, or where a different amide is used (i.e. thiourea instead of urea) in which case any nonreactive material carried over in the reactive stream of the first reaction will be taken out by the formation of adduct crystals in the second reaction. Similarly the nonreactive stream carried by conduit 72 can be introduced into a second adduct type hydrocarbon separation system employing either the same or different amide in which case the ultra-pure product will be recovered as the nonreactive or reactive stream respectively.

As a matter of operating expediency, a plurality of identical separation systems can be utilized in parallel. Thus, for instance, if the total cycle time is two hours and the time for filling the reaction vessel is 30 minutes, then four reaction vessels can be used in parallel so that one is being filled at any given time.

In a preferred alternate embodiment, the cyclic process takes place as follows: the adduct is formed, the nonreactive raffinate is separated by means of phase separation, the remaining sulfolane and adduct crystals are heated to release the reactive hydrocarbon and amide; then the mixture is cooled a second time to again form an adduct, the raffinate (nonreactive hydrocarbon occluded to the adduct crystals during the initial separation) is separated a second time, the remaining sulfolane and adduct crystals are heated a second time to release the reactive hydrocarbons; and so on. This cycle is repeated from two to six times, the last time the released reactive hydrocarbon is withdrawn as product instead of being cooled to form an adduct again. This enables the formation of exceptionally pure reactive product with a minimum utilization of complex equipment.

In operation, a mixed hydrocarbon feed is introduced into the reaction zone which already contains sulfolane and amide crystals, that is, the amide and sulfolane are added initially in the start-up of the reaction and thereafter simply remain in the reaction vessel. This mixture is agitated vigorously as it is cooled down to a point where an adduct forms between the reactive hydrocarbon and the amide. The agitation then ceases and reactants stratify into an upper layer of unreacted hydrocarbon and a lower layer comprised essentially of a slurry of hydrocarbon adduct crystals in a sulfolane compound. Because of the incompatibility of the hydrocarbons in the upper zone with the sulfolane compound, the upper layer is in the form of a separate phase. For instance in the case of straight chain-branched chain hydrocarbon feed using urea, the upper zone is comprised of branched chain hydrocarbon, and the lower phase is composed essentially of sulfolane compound plus straight chain hydrocarbon-urea adduct crystals. Any aromatics present will dissolve in the sulfolane until such time as the sulfolane is saturated with aromatics and thereafter the aromatics will form a portion of the non-reactive phase.

When dealing with heavier hydrocarbons, no significant problems are encountered as a result of the build-up of aromatics in the sulfolane compound. With lighter hydrocarbons, however, there is some problem with aromatic contamination of the reactive product thus making it desirable to extract the aromatics from the feed or from the sulfolane during the reaction.

In an alternate embodiment of this invention wherein the initial feed stream comprises isoparaffins, normal paraffins, and cycloalkanes (cycloparaffins), such as cyclohexane, the mixed feed can be treated with urea in sulfolane in a first hydrocarbon separation system to yield a nonreactive product comprising cycloalkanes such as cyclohexane and isoparaffins, for instance heptane isomers which are higher in molecular weight than the cyclohexane (but which boil at about the same temperature as cyclohexane).

This nonreactive product (i.e. cyclohexane and branched chain heptanes) from the first hydrocarbon separation system can then be reintroduced into a second identical hydrocarbon separation system and treated with thiourea in sulfolane to leave as the sole nonreactive product the cycloalkanes. It is to be noted that under certain conditions, cycloalkanes, such as cyclohexane, will form adducts with thiourea. However, where there is a mixture of materials such as cyclohexane and higher molecular weight branched chain hydrocarbons, such as isomeric heptanes, the heptane isomers (higher molecular weight than cyclohexane) will be adducted preferentially to cyclohexane. By using a slight excess of the amide the exceptionally pure cyclohexane can be produced with only a minor amount of cyclohexene being carried down with the reactive hydrocarbon stream.

While many standard parts such as temperature controllers, valves, pumps, and the like have not been shown in the drawing for the sake of simplicity, their inclusion is understood by those skilled in the art and is within the scope of the invention.

EXAMPLE I

Referring to the drawing, 35 barrels of $C_{10}$ to $C_{13}$ cut hydrocarbons are charged to a reaction vesel such as vessel 12 of the figure, to which have already been charged 140 barrels of sulfolane and 1000 pounds of urea. The total cycle time is 2 hours. The cycle sequence is tabulated below:

normal paraffin by-product are obtained as non-normal paraffin by-product.

OPERATING CYCLE

| Cycle Step | | Time, min. | Mixer 26 | Coil 30 | Pump 14 | 52 | 77 | 122 | 62 |
|---|---|---|---|---|---|---|---|---|---|
| 1 | Charge HC | 30 | On | Cooling | On | Off | Off | Off | On. |
| 2 | Adduction | 20 | On | Cooling | Off | Off | Off | Off | Off. |
| 3 | Separation | 30 | Off | Off | Off | Off | Off | Off | Off. |
| 4 | Pump off raffinate | 10 | Off | Off | Off | On | Off | Off | Off. |
| 5 | Break adduct | 20 | On | Heat | Off | Off | Off | Off | Off. |
| 6 | Pump off normal paraffins | 10 | Off | Off | Off | Off | On | On | Off. |

Cycle step No. 1 takes 30 minutes and involves charging the feed hydrocarbon, the sulfolane and urea solution being already in the reaction vessel, except on initial start-up. The temperature is at 160° F. at this time and the cooling is started. During cycle step 2 the cooling is continued until the mixture reaches a temperature of 120° F. This step takes 20 minutes during which time the adduct is formed. During cycle step 3, which takes 30 minutes, the cooling, mixing, and all pumps are off while phase separation occurs to float the non-normal paraffins to an upper phase while the sulfolane containing adduct crystals forms a lower phase. The temperature is still at approximately 120° F. During cycle step 4, which takes 10 minutes, the cooling and mixer are still off and the temperature is still at approximately 120° F. During this time the non-normal paraffins are pumped from reaction vessel 12 to a raffinate settler which is kept at 120° F. Water and/or sulfolane entrained in this non-normal paraffinic raffinate is settled out in raffinate settler and the non-normal paraffinic product is introduced into a raffinate water wash column which is maintained at 120° F. Water at a rate of 1 gallon per minute is added to the top of this column to wash the non-normal paraffinic material which is thereafter withdrawn as non-normal paraffinic product. During cycle step No. 5 which takes 20 minutes heat is applied to heat exchange coils 30 to raise the temperature of the sulfolane adduct to between 160 and 180° F. at which temperature the adduct is decomposed releasing normal paraffinic product and urea which dissolves in the sulfolane. Two phases then form, an upper normal paraffinic hydrocarbon phase and a lower sulfolane phase containing urea in solution. During the final cycle step No. 6 the heat is turned off and the normal paraffins are removed and introduced into a reactive hydrocarbon settler maintained at 120° F. Entrained water and/or sulfolane is withdrawn from this settler and returned to the reaction vessel. The normal paraffinic hydrocarbon product is withdrawn from this settler and introduced into a normal paraffin wash column. About 0.25 gallon per minute of water is introduced into the top of this wash column and the resulting washed normal paraffinic hydrocarbon product is recovered as a product of the process. This wash column is maintained at 120° F. During this final cycle step a slip stream of urea dissolved in sulfolane is withdrawn from the reaction vessel at a rate of 12 gallons per minute, cooled, passed to a urea separator, wherein the urea which has crystallized out is separated and returned to the reaction vessel, and introduced therein. This sulfolane tank and urea settler is maintained at 120° F. at 10 p.s.i.g. pressure. The sulfolane is withdrawn (decanted) and introduced into a sulfolane rerun column maintained at 400° F. at 10 p.s.i.g. pressure. Water and aromatics are taken off the top of the sulfolane rerun column and introduced into a settling tank (overhead accumulator) maintained at 100° F. at 5 p.s.i.g. pressure The sulfolane is recovered as bottoms product of the rerun column and returned to the reactor. The reactor contents are still at 160° F.

Six barrels of normal paraffin are recovered as reactive normal paraffin hydrocarbon product, representing 95 volume percent of the normal paraffin in the feed of about 90 volume percent purity. Twenty-nine barrels of non-

EXAMPLE II

Thirty-five barrels of mixed hydrocarbon feed are introduced into a reaction vessel of a hydrocarbon separation system identical to that of Example I. The same procedure is followed except after cycle step 5 cooling medium is circulated through coils 30 so as to reform the adduct, that is, steps 2, 3, 4 and 5 are repeated for a second time. Steps 2–5 are then repeated a third time, a fourth time, a fifth time, and a sixth time, after which cycle step 6 is carried out to yield a normal hydrocarbon product of 98 volume percent purity.

While this invention has been described in detail for the purpose of illustration it is not to be construed as limited thereby but is intended to cover all the changes and modifications within the spirit and scope thereof.

We claim:

1. A method for separating a mixture of hydrocarbon compounds, wherein at least one of said compounds contains from 6 to 50 carbon atoms per molecule and is reactive with an amide selected from the group consisting of urea and thiourea to form a solid adduct therewith, which comprises:

(1) introducing said mixture, said amide, and a sulfolane compound into a reaction zone;
   (2) admixing the contents of said reaction zone at a temperature below the decomposition temperature of said adduct to form said adduct;
   (3) forming an upper unreactive hydrocarbon phase and a lower phase comprising a slurry of said adduct crystals in said sulfolane;
   (4) withdrawing said unreactive hydrocarbon as a product of the process from said reaction zone;
   (5) heating said slurry while still within said reaction zone to a temperature above the decomposition temperature of said adduct to decompose said adduct and release said reactive hydrocarbon and said amide;
   (6) forming an upper phase of said released reactive hydrocarbon and a lower phase of said sulfolane compound containing said amide dissolved therein; and
   (7) withdrawing said reactive hydrocarbon phase as a product of the process from said reaction zone.

2. A method according to claim 1 wherein said sulfolane and said amide are present in said reaction zone at a temperature above the decomposition point of said adduct at the time said mixture of hydrocarbon compounds is added, said temperature thereafter being lowered.

3. A method according to claim 1 wherein said amide is urea and wherein the sulfolane compound is sulfolane.

4. A method according to claim 1 wherein said amide is urea, said reactive hydrocarbon is a straight chain hydrocarbon having from 10–13 carbon atoms per molecule, and the sulfolane compound is sulfolane.

5. A method according to claim 1 wherein said mixture of hydrocarbon compounds comprises branched heptanes and cyclohexane, said amide is thiourea, and said cyclohexane is recovered as nonreactive product.

6. A method according to claim 1 wherein said mixture of hydrocarbon compounds is subjected to a sulfolane wash to remove aromatics prior to the introduction of said mixture of hydrocarbon compounds into said reaction zone, said aromatics being recovered as an aromatic product of the process.

7. A method according to claim 1 wherein two of said reaction zones are connected in series, one of the products of the first serving as the feed for the second.

8. A method according to claim 1 wherein:
a slip stream of said sulfolane and said amide is withdrawn from said reaction zone;
said sulfolane is separated from said amide;
said amide is returned to said reaction zone;
said sulfolane is passed to a separation zone wherein aromatics are stripped from said sulfolane and recovered as an aromatic product of the process; and
said sulfolane is returned to said reaction zone.

9. A method according to claim 1 wherein after step 1, steps 2, 3, 4, 5, and 6 are carried out from 2 to 6 times prior to carrying out step 7.

10. A method according to claim 9 wherein said sulfolane compound is sulfolane.

11. A method according to claim 10 wherein said amide is urea.

References Cited

UNITED STATES PATENTS

| 2,520,715 | 8/1950 | Fetterly | 260—670 |
| 2,914,455 | 11/1959 | Keller | 208—25 |

HERBERT LEVINE, Primary Examiner

U.S. Cl. X.R.

208—25; 260—676, 96.5